United States Patent [19]

L'Eplattenier et al.

[11] 4,024,132

[45] * May 17, 1977

[54] AZOMETHINE PIGMENTS

[75] Inventors: Francois L'Eplattenier, Therwil; André Pugin, Riehen; Laurent Vuitel, Therwil, all of Switzerland

[73] Assignee: Ciba-Geigy Corporation, Ardsley, N.Y.

[ * ] Notice: The portion of the term of this patent subsequent to Aug. 10, 1993, has been disclaimed.

[22] Filed: June 7, 1976

[21] Appl. No.: 693,388

Related U.S. Application Data

[62] Division of Ser. No. 502,246, Aug. 30, 1974, Pat. No. 3,974,149.

[52] U.S. Cl. .......................................... 260/240 G
[51] Int. Cl.² ........................................ C09B 55/00
[58] Field of Search.......................... 260/240 G

[56] References Cited

UNITED STATES PATENTS

| | | |
|---|---|---|
| 3,867,404 | 2/1975 | Von der Crone et al. ... 260/240 G X |
| 3,896,113 | 7/1975 | Kaul ............................. 260/240 G |

*Primary Examiner*—Allen B. Curtis
*Attorney, Agent, or Firm*—Vincent J. Cavalieri

[57] ABSTRACT

Azomethine pigments of the formula

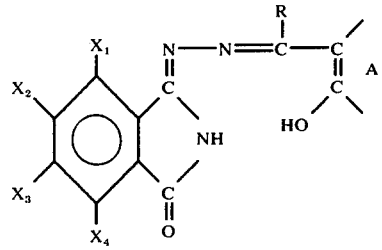

and metal complexes thereof, wherein A denotes an isocyclic or heterocyclic aromatic radical, R denotes a H atom, an alkyl group containing 1–6 C atoms, or an aryl radical, $X_2$ and $X_4$ denote H atoms or halogen atoms, $X_1$ and $X_3$ denote H atoms or halogen atoms, alkoxy or alkylmercapto groups containing 1–6 C atoms, cycloalkoxy groups containing 5–6 C atoms, or aralkoxy, aryloxy or arylmercapto groups, it being possible for one of the substituents $X_1$–$X_4$ also to be a nitro group which are useful for pigmenting of high molecular material.

8 Claims, No Drawings

AZOMETHINE PIGMENTS

This is a division of application Ser. No. 502,246, filed on Aug. 30, 1974, now U.S. Pat. No. 3,974,149.

It has been found that new, valuable azomethine pigments of the formula

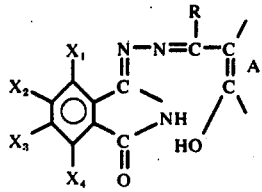
(1)

wherein A denotes an isocyclic or heterocyclic aromatic radical, R denotes a H atom, an alkyl group containing 1–6 C atoms, or an aryl radical, $X_2$ and $X_4$ denote H atoms or halogen atoms, $X_1$ and $X_3$ denote H atoms or halogen atoms, alkoxy or alkylmercapto groups containing 1–6 C atoms, cycloalkoxy groups containing 5–6 C atoms, or aralkoxy, aryloxy or arylmercapto groups, it being possible for one of the substituents $X_1$–$X_4$ also to be a nitro group, are obtained if a. an isoindolinone hydrazone of the formula

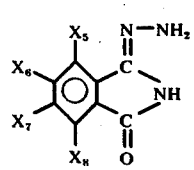
(2)

particularly an isoindolinone hydrazone of the formula

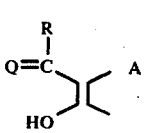
(3)

wherein $X_5$ and $X_7$ denote H atoms or chlorine atoms or alkoxy groups containing 1–4 C atoms, $X_6$ and $X_8$ denote H atoms or chlorine atoms, $X_6$ and $X_8$ representing chlorine atoms if $X_5$ and $X_7$ denote alkoxy groups, is condensed with a compound of the formula

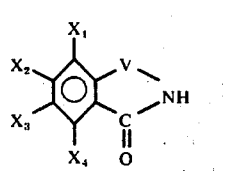
(4)

wherein Q denotes an O atom or an imino group, or b. an isoindolinone of the formula (5)

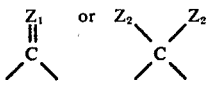

wherein V denotes a group of the formula

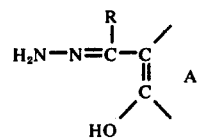

wherein $Z_1$ denotes an imino or thio group and the $Z_2$'s denote halogen atoms, or alkoxy or secondary amino groups, is condensed with a hydrazone of the formula (6)

$H_2N-N=C-C$ ...

and the resulting azomethine is optionally metallised.

Azomethine pigments of particular interest are those of the formula

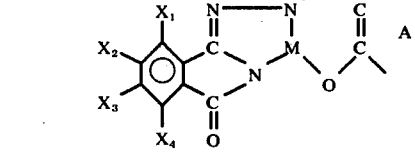
(7)

wherein M denotes a divalent metal atom and A, R and $X_1$–$X_4$ have the meaning indicated, and particularly those of the formula (8)

wherein $A_1$ denotes a benzene, pyridine, pyrimidine or pyrane radical which can also contain a fused benzene nucleus, or denotes a pyrazolone radical, $M_1$ denotes a copper or nickel atom, $X_5$ to $X_8$ have the meaning indicated and $R_1$ denotes a hydrogen atom or the methyl group.

Azomethine pigments which are particularly preferred are those of the formula

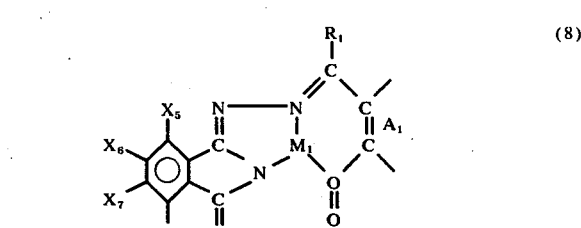
(9)

wherein $R_1$, $M_1$ and $X_5$ to $X_8$ have the meaning indicated above, $Y_3$ and $Y_4$ denote H atoms or halogen atoms, alkyl or alkoxy groups containing 1–4 C atoms, nitro groups or groups of the formula

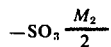

wherein $M_2$ denotes a Ca, Sr, Ba or Mn atom, and Z represents an O atom or an imino group, and particularly those of the formula

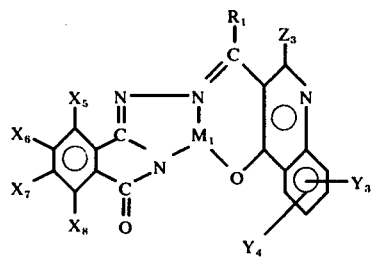
(10)

wherein $Z_3$ denotes a hydroxyl or methyl group, and $R_1$, $M_1$, $X_5$ to $X_8$, $Y_3$ and $Y_4$ have the meaning indicated above.

Azomethine pigments of particular interest are also those of the formula

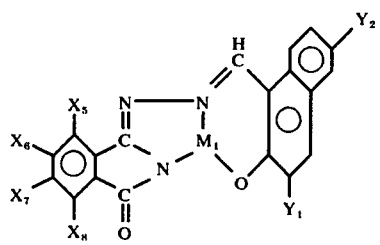
(11)

wherein $M_1$ and $X_5$ to $X_8$ have the meaning indicated above, $Y_1$ denotes a H atom, a carboxyl group, a carbamoyl group, an alkoxycarbonyl or alkylcarbamoyl group containing 2–6 C atoms, a phenylcarbamoyl group which is optionally substituted in the phenyl radical by halogen atoms, alkyl or alkoxy groups containing 1–4 C atoms, or by trifluoromethyl groups, or a group of the formula

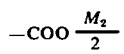

wherein $M_2$ has the meaning indicated above, and $Y_2$ denotes a H atom or halogen atom, an alkoxy group containing 1–4 C atoms, a nitro group or a nitrile group, those of the formula

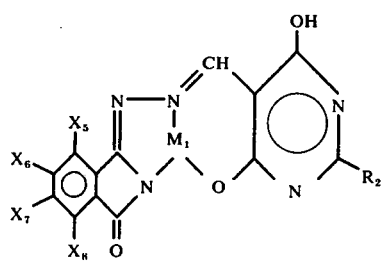
(12)

wherein $R_2$ denotes an alkyl group of 1–4 C-atoms, preferably a methyl group, or an optionally substituted aryl group, those of the formula

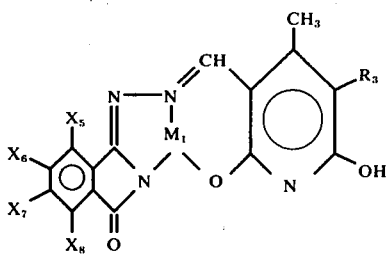
(13)

wherein $R_3$ denotes a nitrile or carbamoyl group, those of the formula

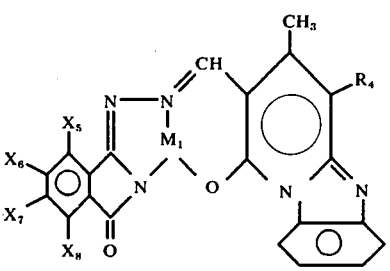
(14)

wherein $R_4$ denotes a nitrile or carbamoyl group, those of the formula

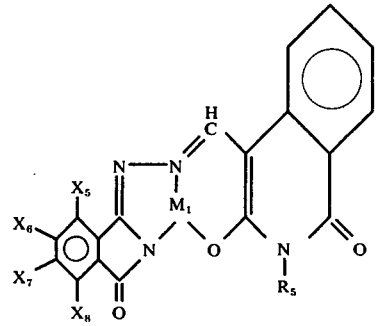
(15)

wherein $R_5$ denotes a H atom, an alkyl group containing 1–4 C atoms, or an aryl group, or those of the formula

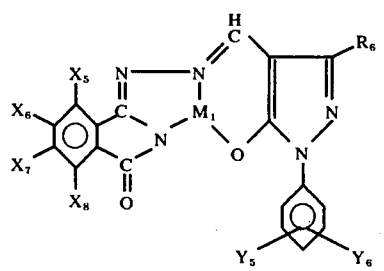
(16)

wherein $M_1$ and $X_5$ to $X_8$ have the meaning indicated above and $R_6$ denotes an alkyl group containing 1–4 C atoms, an alkoxycarbonyl group containing 2–5 C atoms, a carboxyl group, a carbamoyl group or a group of the formula

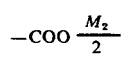

wherein $M_2$ denotes a Ca, Sr, Ba or Mn atom, and $Y_5$ and $Y_6$ denote H atoms or halogen atoms, alkyl or alkoxy groups containing 1–4 C atoms, nitro, acylamino, carbamoyl or sulphamoyl groups or groups of the formula

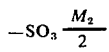

wherein $M_2$ denotes a Ca, Sr, Ba or Mn atom.

The isoindolinone hydrazones used as starting materials are obtained by reacting hydrazine with an isoindolinone of the formula

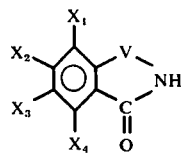
(17)

particularly an isoindolinone of the formula

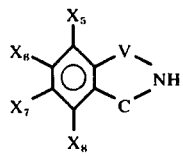
(18)

$X_1$–$X_8$ and V in the formulae indicated having the indicated meaning.

It is preferable to start from 3-imino-isoindolinone or from 3,3'-dialkoxy-iminoisoindolinones of the formula

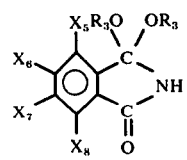
(19)

wherein $X_5$ to $X_8$ have the meaning indicated and $R_3$ denotes an alkyl group containing 1–4 C atoms. Those starting materials wherein $X_5$ to $X_8$ denote chlorine atoms or hydrogen atoms, are known, and those wherein $X_5$ and $X_7$ denote alkoxy, cycloalkoxy, aralkoxy, aryloxy, alkylthio or arylthio groups and $X_6$ and $X_8$ denote chlorine atoms, can be obtained by reacting an ammonium salt or ester of tetrachloro-o-cyanobenzoic acid in a hydrophilic organic solvent with a compound of the formula $X_5M_3$ wherein $X_5$ has the meaning indicated above and $M_3$ denotes an alkali metal atom, and esterifying the product obtained, if necessary.

The following examples of isoindolinones may be mentioned: 3,3-Dimethoxy-4,5,6,7-tetrachloro-isoindolinone, 3,3-dimethoxy-4,5,6,7-tetrabromo-isoindolinone, 3,3,6-trimethoxy-4,5,7-trichloro-isoindolinone, 3,3-dimethoxy-4,5,7-trichloro-6-butoxy-isoindolinone, 3,3-dimethoxy-4,5,7-trichloro-6-phenoxy-isoindolinone, 3,3-dimethoxy-4,5,7-trichloro-6-(p-chlorophenoxy)-isoindolinone, 3,3-dimethoxy-4,5,7-trichloro-6-(o-methylphenoxy)-isoindolinone, 3,3-dimethoxy-4,5,7-trichloro-6-methylmercapto-isoindolinone, 3,3-dimethoxy-4,5,7-trichloro-6-ethylmercapto-isoindolinone, 3,3,4,6-tetramethoxy-5,7-dichloro-isoindolinone and 3-imino-isoindolinone.

The hydrazones of the isoindolinones mentioned are condensed with compounds of the formula

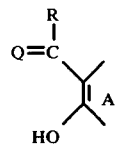
(20)

wherein Q denotes an O atom or an imino group, for example a phenylimino group, especially with aldehydes of the formula

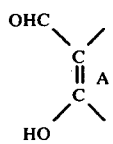
(21)

A and R in the formula indicated having the abovementioned meaning.

Aldehydes or ketones of particular interest are those of the formula

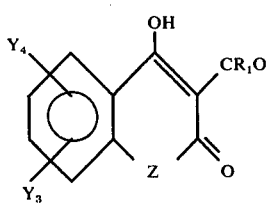
(22)

wherein $R_1$ denotes a hydrogen atom or the methyl group, and $Y_3$, $Y_4$ and Z have the meaning indicated, and especially the hydroxyquinoline aldehydes of the formula

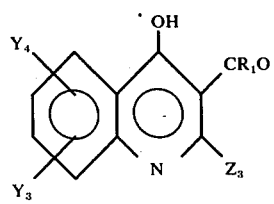
(23)

wherein $R_1$, $Y_3$, $Y_4$ and $Z_3$ have the meaning indicated.

Aldehydes of particular interest are also those of the following formulae

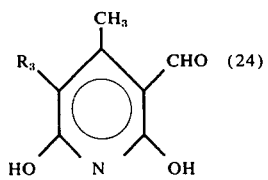 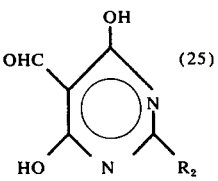
(24)               (25)

wherein $R_3$ denotes a nitrile or carbamoyl group and $R_2$ denotes a lower alkyl group or an aryl group,

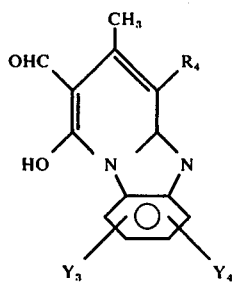

(26)

wherein R₄ has the same meaning as R₃,

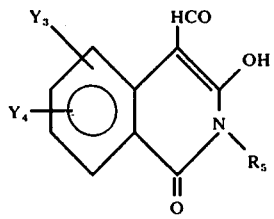

(27)

wherein Y₃ and Y₄ have the meaning indicated above and R₅ denotes a H atom, a lower alkyl group or an aryl group, hydroxynaphthaldehydes of the formula

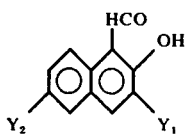

(28)

wherein Y₁ and Y₂ have the meaning indicated above, or pyrazolone aldehydes of the formula

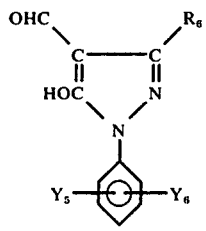

(29)

wherein R₆, Y₅ and Y₆ have the meaning indicated above. In the above formulae 22 to 29, the aldehyde group can also be replaced by an azomethine group of the formula —CR₁=Q or —CH=Q wherein Q preferably denotes the phenylimino group.

The following aldehydes or ketones may be mentioned as examples:

1. o-Hydroxybenzaldehydes

Salicylaldehyde, 4-chloro-2-hydroxybenzaldehyde, 5-chloro-2-hydroxybenzaldehyde, 3-nitro-2-hydroxybenzaldehyde, 5-nitro-2-hydroxybenzaldehyde, 3,5-dichloro-2-hydroxybenzaldehyde, 3,5-dibromo-2-hydroxybenzaldehyde, 5-phenylazo-2-hydroxybenzaldehyde, 5-(2'-chloro-phenylazo)-2-hydroxybenzaldehyde, 5-(2',5'-dichlorophenylazo)-2-hydroxybenzaldehyde, 5-(2'-methyl-phenylazo)-2-hydroxybenzaldehyde, 5-(2'-methoxy-phenylazo)-2-hydroxybenzaldehyde, 5-(2'-methoxy-4'-nitro-phenylazo)-2-hydroxybenzaldehyde and 5-(2'-methoxy-5'-carbamoyl-phenylazo)-2-hydroxybenzaldehyde.

2. Hydroxynaphthaldehydes

2-Hydroxynaphthaldehyde, 6-bromo-2-hydroxynaphthaldehyde, 5-nitro-2-hydroxynaphthaldehyde, 2-hydroxy-3-carboxy-naphthaldehyde, 2-hydroxy-3-methoxycarbonyl-naphthaldehyde, 2-hydroxy-3-phenylcarbamoyl-naphthaldehyde, 2-hydroxy-3-(4'-chlorophenylcarbamoyl)naphthaldehyde, 2-hydroxy-3-(4'-chloro-2'-methylphenylcarbamoyl-naphthaldehyde, 2-hydroxy-3-(2',5'-dimethoxy-3'-chloro-phenylcarbamoyl-naphthaldehyde, 2-hydroxy-6-bromo-3-carboxynaphthaldehyde and 2-hydroxy-6-bromo-3-phenylcarbamoylnaphthaldehyde.

3. Heterocyclic aldehydes and ketones 2,6-Dihydroxy-4-methyl-5-cyano-3-pyridine aldehyde, 2,6-dihydroxy-4-methyl-5-carboxy-3-pyridine aldehyde, 2,6-dihydroxy-4-methyl-5-carbamoyl-3-pyridine aldehyde, 2,4-dihydroxy-3-quinoline aldehyde, 5-chloro-2,4-dihydroxy-3-quinoline aldehyde, 6-chloro-2,4-dihydroxy-3-quinoline aldehyde, 7-chloro-2,4-dihydroxy-3-quinoline aldehyde, 8-chloro-2,4-dihydroxy-3-quinoline aldehyde, 6,8-dichloro-2,4-dihydroxy-3-quinoline aldehyde, 7,8-dichloro-2,4-dihydroxy-3-quinoline aldehyde, 6-methyl-2,4-dihydroxy-3-quinoline aldehyde, 7-methyl-2,4-dihydroxy-3-quinoline aldehyde, 8-methyl-2,4-dihydroxy-3-quinoline aldehyde, 6-chloro-8-methyl-2,4-dihydroxy-3-quinoline aldehyde, 2,4-dihydroxy-3-acetyl-quinoline, 2,4-dihydroxy-3-acetyl-6-methyl-quinoline, 2,4-dihydroxy-3-acetyl-6-chloro-quinoline, 3-hydroxy-4-isoquinolone aldehyde, N-methyl-3-hydroxy-4-isoquinoline aldehyde, N-phenyl-3-hydroxy-4-isoquinoline aldehyde, N-naphthyl-3-hydroxy-4-isoquinolone aldehyde, 2-methyl-4,6-dihydroxy-5-pyrimidine aldehyde, 2-phenyl-4,6-dihydroxy-5-pyrimidine aldehyde, 4-hydroxy-3-quinaldine aldehyde, 6-chloro-4-hydroxy-3-quinaldine aldehyde, 6-methoxy-4-hydroxy-3-quinaldine aldehyde and further aldehydes.

4-Hydroxycoumarin-3-aldehyde, 1-phenyl-3-methyl-4-formylpyrazolone-5, 1-phenyl-3-carboxy-4-formyl-pyrazolone-5, 1-phenyl-3-methoxycarbonyl-4-formyl-pyrazolone-5, 1-phenyl-3-ethoxycarbonyl-4-formyl-pyrazolone-5, 1-(2'-chlorophenyl)-3-methyl-4-formyl-pyrazolone-5, 1-(4'-chlorophenyl)-3-methyl-4-formyl-pyrazolone-5, 1-(2'-methylphenyl)-3-methyl-4-formyl-pyrazolone-5 and 1-(4'-methylphenyl)-3-methyl-4-formylpyrazolone-5.

Instead of the aldehydes or ketones, it is also possible to use imines, particularly phenylimines, thereof.

For the embodiment (b) of the process according to the invention, the starting materials used are appropriately, on the one hand, isoindolinones of the formula 20), particularly those of the formula 21), and, on the other hand, hydrazones of the aldehydes or ketones of the formulae 22–29).

The condensation of the hydrazone with the oxo compound or the isoindolinone is appropriately carried out in water or an organic solvent, at an elevated temperature, preferably between 50° C and the boiling point of the solvent used. The following examples of solvents may be mentioned: water, alcohol, glacial acetic acid, dioxane, dimethylformamide, dimethylacetamide, N-methylpyrrolidone, butyrolactone, glycol monomethyl ether, xylene, chlorobenzene, o-dichlorobenzene, nitrobenzene or mixtures thereof.

As the resulting azomethines are sparingly soluble in the solvents mentioned, they can be isolated easily by filtration. Impurities which may be present can be removed by washing.

For conversion into the metal complexes, the azomethines obtained are treated with agents which donate divalent metals, for example with salts of zinc, manganese, cobalt or iron, but particularly of copper and nickel, or of mixtures of such metals. The formates, acetates or stearates of these metals are preferably used. The metallisation is appropriately carried out in one of the abovementioned solvents.

The metallisation can also be carried out at the same time as the condensation, by condensing the aldehyde together with the hydrazone in one of the abovementioned solvents, in the presence of metal salts.

The metal complexes often additionally contain 0.5–2 mols of water of crystallisation, which, in appropriate instances, exerts a slight influence on the shade of the colorant obtained.

The new colorants represent valuable pigments which can be used, in a finely dispersed form, for pigmenting high molecular organic material, for example cellulose ethers and esters, such as ethylcellulose, nitrocellulose, cellulose acetate or cellulose butyrate, natural resins or synthetic resins, such as polymerisation resins or condensation resins, for example aminoplasts, especially urea-formaldehyde and melamine-formaldehyde resins, alkyd resins, phenoplasts, polycarbonates, polyolefines, such as polystyrene, polyvinyl chloride, polyethylene or polypropylene, polyacrylonitrile, polyacrylic acid esters, polyamides, polyurethanes or polyesters, rubber, casein, silicone and silicone resins, individually or as mixtures.

It is immaterial here whether the high molecular compounds mentioned are present as plastic compositions or melts or in the form of spinning solutions, lacquers, paints or printing inks. Depending on the application, it is found to be advantageous to use the new pigments as toners or in the form of preparations.

The resulting colorations are distinguished by good fastness to light and migration.

In the following examples, unless otherwise specified, the parts denote parts by weight, and the percentages denote percentages by weight.

A. PREPARATION OF THE COMPLEX-FORMING AGENTS

EXAMPLE 1

119.6 g of 3,4,5,6-tetrachloro-2-cyanobenzoic acid methyl ester are dissolved in 600 ml of methanol and 70.6 g of a 30.6% strength methanolic solution of Na methylate. The solution is cooled to 10° C and is added dropwise at 10° C to a solution of 200 ml of hydrazine hydrate in 400 ml of methanol. A yellowish precipitate is formed. The reaction mixture is stirred at room temperature for 2 hours and is then warmed to 35° C over the course of 30 minutes and 200 ml of glacial acetic acid are added at this temperature. After stirring for 1 hour at room temperature, the product is filtered off and the filter residue is washed with methanol and water. The material filtered off is then extracted by boiling in 1 l of methylcellosolve for a further 2 hours, filtered off at room temperature and washed with methylcellosolve and methanol. After drying at 70° C, 98 g (82% of theory) of analytically pure 4,5,6,7-tetrachloro-isoindolin-1-on-3-ylidene hydrazine of the formula

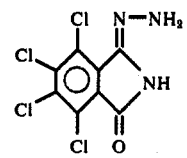

are obtained.

In an analogous manner, 5,7-dichloro-4,6-dimethoxy-isoindolin-1-on-3-ylidene hydrazine is obtained in 87% yield from 4,6-dichloro-3,5-dimethoxy-2-cyanobenzoic acid methyl ester, 4,5,7-trichloro-6-methoxy-isoindolin-1-ylidene-3-hydrazine is obtained in 91% yield from 3,5,6-trichloro-4-methoxy-2-cyanobenzoic acid methyl ester and 4,5,7-trichloro-6-phenoxy-isoindolin-1-on-3-ylidene hydrazine is obtained in 67% yield from 3,4,6-trichloro-5-phenoxy-2-cyanobenzoic acid methyl ester.

4.49 g of tetrachloro-isoindolin-1-ylidene-3-hydrazine and 4.36 g of 1-formyl-2-hydroxy-3-naphthoic acid anilide in 250 ml of methylcellosolve are heated under reflux for 30 minutes. The thick, yellow precipitate is filtered off at 80° C, washed well with methylcellosolve, alcohol and acetone and dried at 80° C. 8.3 g (97% of theory) of the analytically pure colorant of the formula

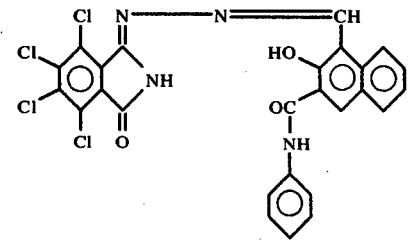

are obtained. Instead of methylcellosolve, Carbitols, dimethylformamide or glacial acetic acid can also be used.

The azomethines of the following formula

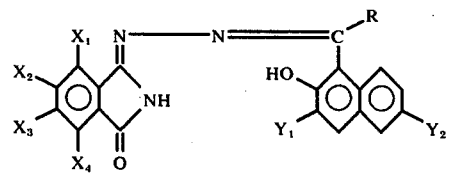

wherein the symbols have the meaning indicated in the following table, are obtained by an analogous process.

Table I

| Example No. | $X_1$ | $X_2$ | $X_3$ | $X_4$ | $Y_1$ | $Y_2$ | R | Shade | Yield |
|---|---|---|---|---|---|---|---|---|---|
| 2 | Cl | Cl | Cl | Cl | H | H | H | yellow | 94% |
| 3 | Cl | Cl | Cl | Cl | —COOH | H | H | yellow | 78% |
| 4 | Cl | Cl | Cl | Cl | —CONH—⟨Cl⟩—CH₃ | H | H | orange | 74% |

Table I-continued

| Example No. | X₁ | X₂ | X₃ | X₄ | Y₁ | Y₂ | R | Shade | Yield |
|---|---|---|---|---|---|---|---|---|---|
| 5 | Cl | Cl | Cl | Cl | —COOH | Br | H | yellow | 75% |
| 6 | CH₃O | Cl | CH₃O | Cl | —COOH | H | H | yellow | 87% |
| 7 | CH₃O | Cl | CH₃O | Cl | —COOH | Br | H | yellow | 89% |
| 8 | CH₃O | Cl | CH₃O | Cl | H | H | H | yellow | 87% |
| 9 | CH₃O | Cl | CH₃O | Cl | —CONH—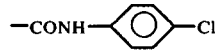—Cl | | H | H | yellow | 90% |

EXAMPLE 10

5.98 g of 4,5,6,7-tetrachloroisoindolin-1-on-3-ylidene hydrazine and 3.78 g of 2,4-dihydroxy-quinoline-3-aldehyde in glacial acetic acid are boiled under reflux for 5 minutes. The yellow precipitate is filtered off at room temperature, washed well with glacial acetic acid, alcohol and acetone and dried at 80° C. 8.2 g (87% of theory) of the analytically pure pigment of the formula

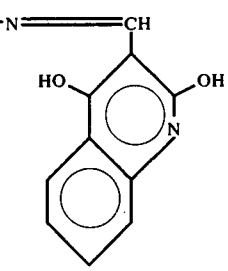

are obtained. The hydrazones of the following formula

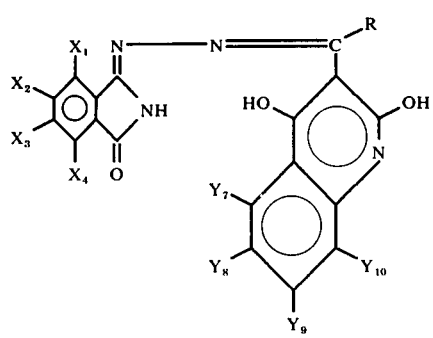

wherein the symbols have the meaning indicated in Table II which follows, are obtained by an analogous process.

Table II

| Example No. | X₁ | X₂ | X₃ | X₄ | Y₇ | Y₈ | Y₉ | Y₁₀ | R | Shade | Yield |
|---|---|---|---|---|---|---|---|---|---|---|---|
| 11 | Cl | Cl | Cl | Cl | H | Cl | H | H | H | yellow | 95% |
| 12 | Cl | Cl | Cl | Cl | H | CH₃ | H | H | H | yellow | 92% |
| 13 | Cl | Cl | Cl | Cl | H | H | Cl | Cl | H | yellow | 90% |
| 14 | Cl | Cl | Cl | Cl | Cl | H | H | Cl | H | yellow | 67% |
| 15 | Cl | Cl | Cl | Cl | H | H | H | H | CH₃ | yellow | 77% |
| 16 | Cl | Cl | OCH₃ | Cl | H | H | H | H | H | yellow | 86% |
| 17 | Cl | Cl | OCH₃ | Cl | H | Cl | H | H | H | yellow | 91% |
| 18 | OCH₃ | Cl | OCH₃ | Cl | H | H | H | H | H | yellow | 78% |
| 19 | OCH₃ | Cl | OCH₃ | Cl | H | CH₃ | H | H | H | yellow | 92% |
| 20 | OCH₃ | Cl | OCH₃ | Cl | H | Cl | H | H | H | yellow | 85% |
| 21 | Cl | Cl | Cl | Cl | H | Cl | H | H | CH₃ | yellow | 81% |
| 22 | Cl | Cl | Cl | Cl | H | CH₃ | H | H | CH₃ | yellow | 67% |
| 23 | OCH₃ | Cl | OCH₃ | Cl | H | H | H | H | CH₃ | yellow | 91% |
| 24 | OCH₃ | Cl | OCH₃ | Cl | H | Cl | H | H | CH₃ | yellow | 82% |
| 25 | OCH₃ | Cl | OCH₃ | Cl | H | CH₃ | H | H | CH₃ | yellow | 93% |
| 26 | OCH₃ | Cl | OCH₃ | Cl | H | H | H | H | H | yellow | 91% |
| 27 | Cl | Cl | Cl | Cl | H | H | Cl | Cl | CH₃ | yellow | 82% |
| 28 | Cl | Cl | CH₃O | Cl | H | H | H | H | CH₃ | yellow | 87% |
| 29 | CH₃O | Cl | CH₃O | Cl | H | H | Cl | Cl | CH₃ | yellow | 97% |
| 30 | CH₃O | Cl | CH₃O | Cl | H | H | Cl | Cl | H | yellow | 91% |
| 31 | Cl | Cl | PhO | Cl | H | H | H | H | CH₃ | yellow | 87% |
| 32 | Cl | Cl | PhO | Cl | H | H | H | H | H | yellow | 94% |

EXAMPLE 33

14.50 g of 5,7-dichloro-4,6-dimethoxy-isoindolin-1-on-3-ylidene hydrazine and 13.2 g of 2,4-dihydroxyquinoline-3-N-phenylaldimine in 250 ml of methylcellosolve are boiled under reflux for 1 hour. The yellow precipitate is filtered off at 100° C, washed well with alcohol and dried at 80° C (under vacuum). 18.75 g (82% of theory) of the analytically pure bishydrazine are obtained.

The following hydrazones, for example, are obtained by an analogous process:

Table III

| Example No. | X₁ | X₂ | X₃ | X₄ | Y₇ | Y₈ | Y₉ | Y₁₀ | R | Shade | Yield |
|---|---|---|---|---|---|---|---|---|---|---|---|
| 34 | Cl | Cl | Cl | Cl | H | Cl | H | H | CH₃ | yellow | 72% |
| 35 | CH₃O | Cl | CH₃O | Cl | H | Cl | H | H | CH₃ | yellow | 82% |

EXAMPLE 36

10.95 g of imino-isoindolinone hydrochloride and 12.18 g of the hydrazone of 2,4-dihydroxyquinoline-3- aldehyde are boiled for 5 minutes with 99 g of sodium acetate in 250 ml of glacial acetic acid. The yellow suspension is filtered at 80° C and the precipitate is washed well with glacial acetic acid, alcohol and acetone and dried at 80° C. 16.8 g (84% of theory) of the analytically pure bishydrazone are obtained.

The following bishydrazones, for example, are obtained by an analogous process:

Table IV

| Ex. No. | $X_1$ | $X_2$ | $X_3$ | $X_4$ | $Y_7$ | $Y_8$ | $Y_9$ | $Y_{10}$ | R | Shade | Yield |
|---|---|---|---|---|---|---|---|---|---|---|---|
| 37 | H | H | H | H | H | H | H | H | $CH_3$ | yellow | 75% |
| 38 | H | H | H | H | H | Cl | H | H | $CH_3$ | yellow | 77% |

EXAMPLE 39

5.98 g of 4,5,6,7-tetrachloroisoindolin-1-on-3-ylidene hydrazine and 4.04 g of 1-phenyl-3-methyl-4-formyl-pyrazolone-5 in 200 ml of alcohol are heated under reflux for one hour. The yellow suspension is filtered while warm and the filter residue is washed well with alcohol and dried at 80° C. 9.2 g (95% of theory) of the analytically pure pigment of the formula

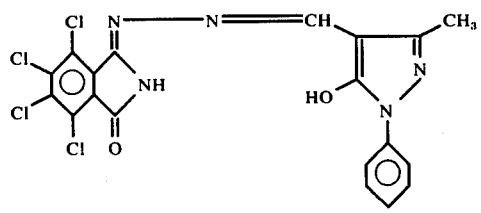

are obtained.
The hydrazones of the following formula

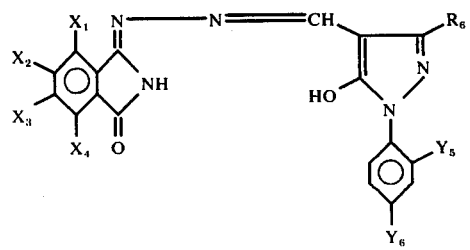

wherein the symbols have the meaning indicated in Table V which follows, are obtained by an analogous process.

Table V

| Example No. | $X_1$ | $X_2$ | $X_3$ | $X_4$ | $X_5$ | $Y_6$ | $R_6$ | Shade | Yield |
|---|---|---|---|---|---|---|---|---|---|
| 40 | Cl | Cl | Cl | Cl | Cl | H | $CH_3$ | yellow | 86% |
| 41 | $OCH_3$ | Cl | $OCH_3$ | Cl | Cl | H | $COOC_2H_5$ | yellow | 68% |
| 42 | Cl | Cl | Cl | Cl | H | H | $CH_3$ | yellow | 100% |
| 43 | $CH_3O$ | Cl | $CH_3O$ | Cl | H | $CH_3$ | $CH_3$ | yellow | 100% |
| 44 | Cl | Cl | Cl | Cl | H | $CH_3$ | $CH_3$ | yellow | 100% |
| 45 | $CH_3O$ | Cl | $CH_3O$ | Cl | H | H | $CONH_2$ | yellow | 73% |

EXAMPLE 46

15.00 g of 4,5,6,7-tetrachloroisoindolin-1-on-3-ylidene hydrazine and 13.25 g of the anil of 4-hydroxycoumarin-3-aldehyde are suspended in 350 ml of methylcellosolve and heated at 100° C for 1 hour. The resulting yellow precipitate is filtered off at room temperature, washed with methylcellosolve, alcohol and acetone and dried at 80° C. 22.3 g (95% of theory) of the colorant of the formula

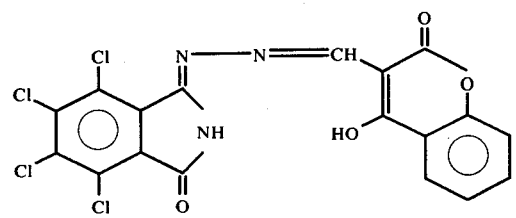

are obtained.

EXAMPLE 47

A colorant having similar properties is obtained if 5,7-dichloro-4,6-dimethoxy-isoindolin-1-on-3-ylidene hydrazine is used as the starting material. The yield is 75% of theory.

The bishydrazones described in Examples 1 – 30 can also be prepared by a known method from the cyanobenzoic acid esters and the corresponding monohydrazones.

EXAMPLE 48

14.5 g of 5,7-trichloro-4,6-dimethoxy-isoindolin-1-on-3-ylidene hydrazine are suspended in a finely dispersed form in 200 ml of methylcellosolve and heated to 70° C. 11.6 g of 1-phenyl-3-carboxy-4-formyl-pyrazolone-5 in 150 ml of methylcellosolve are added slowly to this suspension. The reaction mixture is then kept at 100° C for 2 hours. After cooling to room temperature, the yellow crystals precipitated are filtered off, washed with a little methylcellosolve, with alcohol and acetone and dried at 80° C. 14.7 g (59% of theory) of the analytically pure compound of the formula

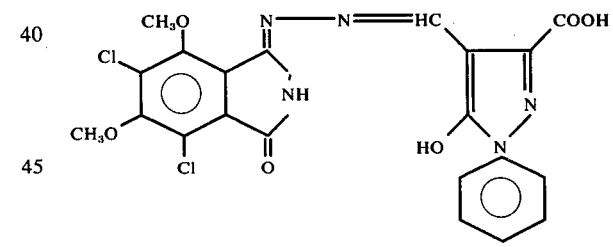

are obtained.

EXAMPLE 49

An analogous compound is obtained in 72% yield, if the instructions of Example 48 are followed, but the starting material is 4,5,6,7-tetrachloro-isoindolin-1-on-3-ylidene hydrazine.

EXAMPLES 50–55

The bishydrazones of the following formula are obtained if the process of Example 10 is followed, using 2-methyl-4-hydroxy-quinoline-3-aldehyde instead of 2,4-dihydroxyquinoline-3-aldehyde.

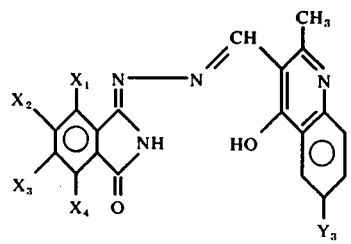

The meaning of the symbols is indicated in Table VI which follows.

Table VI

| Example No. | $X_1$ | $X_2$ | $X_3$ | $X_4$ | $Y_3$ | Shade | Yield |
|---|---|---|---|---|---|---|---|
| 50 | Cl | Cl | Cl | Cl | H | yellow | 97% |
| 51 | $CH_3O$ | Cl | $CH_3O$ | Cl | H | yellow | 84% |
| 52 | Cl | Cl | Cl | Cl | $OCH_3$ | yellow | 94% |
| 53 | $CH_3O$ | Cl | $CH_3O$ | Cl | $CH_3O$ | yellow | 89% |
| 54 | Cl | Cl | Cl | Cl | Cl | yellow | 94% |
| 55 | $CH_3O$ | Cl | $CH_3O$ | Cl | Cl | yellow | 92% |

EXAMPLES 56–57

The bishydrazones of the formula which follows are obtained analogously if a 4,6-dihydroxypyrimidine-5-aldehyde is used instead of 2,4-dihydroxyquinoline-3-aldehyde in the process of Example 10. The meaning of the symbols is given in Table VII.

Table VII

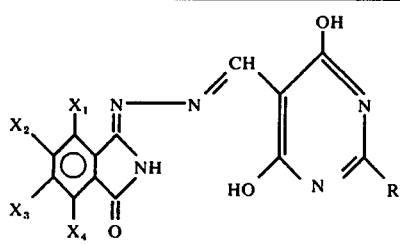

| Example No. | $X_1$ | $X_2$ | $X_3$ | $X_4$ | R | Shade | Yield |
|---|---|---|---|---|---|---|---|
| 56 | Cl | Cl | Cl | Cl | $CH_3$ | yellow | 84% |
| 57 | $CH_3O$ | Cl | $CH_3O$ | Cl | $CH_3$ | yellow | 81% |

EXAMPLES 58–63

The bishydrazones of the following formula are obtained analogously if a 4,6-dihydroxypyrimidine-5-N-phenylaldimine is used instead of 2,4-dihydroxyquinoline-3-N-phenylaldimine in the process of Example 33.

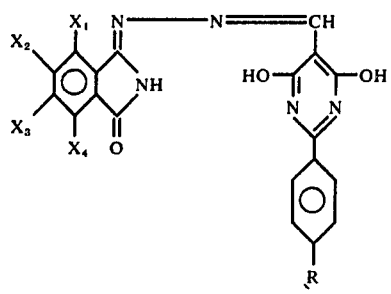

| Example No. | $X_1$ | $X_2$ | $X_3$ | $X_4$ | R | Shade | Yield |
|---|---|---|---|---|---|---|---|
| 58 | Cl | Cl | Cl | Cl | H | yellow | 78% |
| 59 | Cl | Cl | $CH_3O$ | Cl | H | yellow | 92% |
| 60 | $CH_3O$ | Cl | $CH_3O$ | Cl | H | yellow | 85% |
| 61 | Cl | Cl | Cl | Cl | $CH_3$ | yellow | 86% |
| 62 | Cl | Cl | $CH_3O$ | Cl | $CH_3$ | yellow | 85% |
| 63 | $CH_3O$ | Cl | $CH_3O$ | Cl | $CH_3$ | yellow | 73% |

EXAMPLES 64–67

The bishydrazones of the following formula are obtained analogously if a 2,6-dihydroxy-pyridine-5-aldehyde is used instead of 2,4-dihydroxyquinoline-3-aldehyde in the process of Example 10.

| Example No. | $X_1$ | $X_2$ | $X_3$ | $X_4$ | R | Shade | Yield |
|---|---|---|---|---|---|---|---|
| 64 | Cl | Cl | Cl | Cl | CN | yellow | 94% |
| 65 | $CH_3O$ | Cl | $CH_3O$ | Cl | CN | yellow | 86% |
| 66 | Cl | Cl | Cl | Cl | $CONH_2$ | yellow | 73% |
| 67 | $CH_3O$ | Cl | $CH_3O$ | Cl | $CONH_2$ | yellow | 68% |

EXAMPLES 68–70

The bishydrazones of the following formula are obtained analogously if a benzimidazolo-6-hydroxypyridine-5-aldehyde is used instead of 2,4-dihydroxyquinoline-3-aldehyde in the process of Example 10

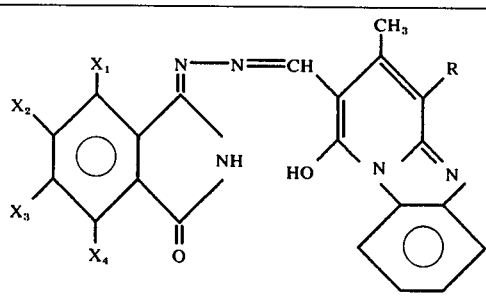

| Example No. | $X_1$ | $X_2$ | $X_3$ | $X_4$ | R | Shade | Yield |
|---|---|---|---|---|---|---|---|
| 68 | Cl | Cl | Cl | Cl | CN | orange | 92% |
| 69 | $CH_3O$ | Cl | $CH_3O$ | Cl | CN | yellow | 88% |
| 70 | $CH_3O$ | Cl | $CH_3O$ | Cl | $CONH_2$ | yellow | 76% |

EXAMPLES 71-88

The bishydrazones of the formula which follows are prepared by a known method from the cyanobenzoic acid esters and the corresponding monohydrazones of 3-hydroxy-isoquinolone-4-aldehyde. The meaning of the symbols is given in the table.

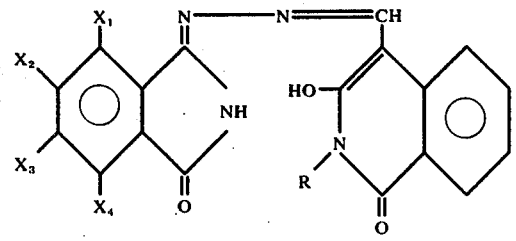

| Example No. | $X_1$ | $X_2$ | $X_3$ | $X_4$ | R | Shade | Yield |
|---|---|---|---|---|---|---|---|
| 71 | Cl | Cl | Cl | Cl | H | yellow-orange | 68% |
| 72 | Cl | Cl | CH₃O | Cl | H | orange | 91% |
| 73 | CH₃O | Cl | CH₃O | Cl | H | yellow | 80% |
| 74 | Cl | Cl | Cl | Cl | CH₃ | orange | 75% |
| 75 | Cl | Cl | CH₃O | Cl | CH₃ | yellow | 90% |
| 76 | CH₃O | Cl | CH₃O | Cl | CH₃ | yellow | 69% |
| 77 | Cl | Cl | Cl | Cl | –C₆H₅ | yellow | 87% |
| 78 | Cl | Cl | CH₃O | Cl | –C₆H₅ | yellow | 90% |
| 79 | CH₃O | Cl | CH₃O | Cl | –C₆H₅ | yellow | 65% |
| 80 | Cl | Cl | Cl | Cl | –C₆H₄–Cl | yellow | 89% |
| 81 | Cl | Cl | CH₃O | Cl | –C₆H₄–Cl | yellow | 90% |
| 82 | CH₃O | Cl | CH₃O | Cl | –C₆H₄–Cl | yellow | 65% |
| 83 | Cl | Cl | Cl | Cl | –C₆H₄–OCH₃ | yellow | 87% |
| 84 | Cl | Cl | CH₃O | Cl | –C₆H₄–OCH₃ | yellow | 86% |
| 85 | CH₃O | Cl | CH₃O | Cl | –C₆H₄–OCH₃ | yellow | 60% |
| 86 | Cl | Cl | Cl | Cl | –naphthyl | orange | 94% |

-continued

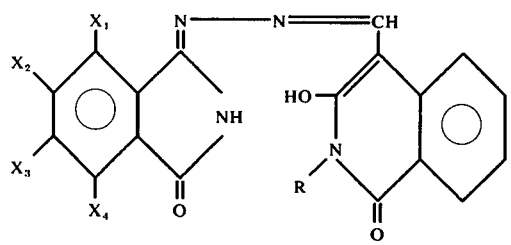

| Example No. | $X_1$ | $X_2$ | $X_3$ | $X_4$ | R | Shade | Yield |
|---|---|---|---|---|---|---|---|
| 87 | Cl | Cl | $CH_3O$ | Cl |  | yellow | 85% |
| 88 | $CH_3O$ | Cl | $CH_3O$ | Cl |  | orange | 82% |

B. PREPARATION OF THE METAL COMPLEXES

EXAMPLE 89

1.72 g of the bishydrazone from Example 1 are reacted, in 70 ml of methylcellosolve, with 0.83 g of Ni(ac)$_2$.4H$_2$O for 4 hours at 90° C. The orange reaction product is filtered off while warm, washed well with methylcellosolve, alcohol and acetone and dried at 80° C. 1.65 g (87%) are obtained of an orange pigment of the formula

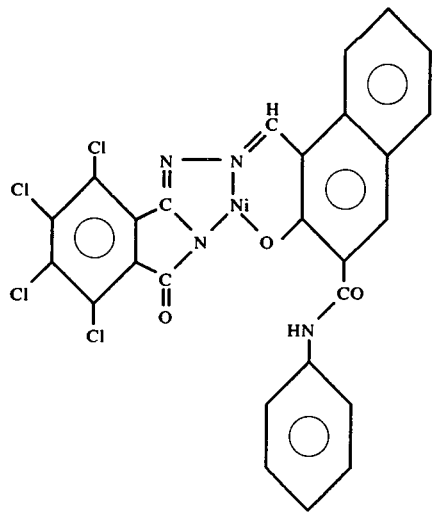

which colours PVC in orange shades of good fastness to light and migration. The matallisation can also be carried out, for example, in dimethylformamide or Carbitol. The following metal complexes are prepared by an analogous process:

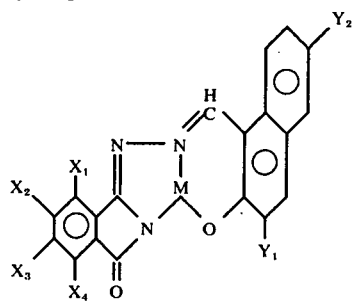

Table VIII

| Example No. | $X_1$ | $X_2$ | $X_3$ | $X_4$ | $Y_1$ | $Y_2$ | M | Shade |
|---|---|---|---|---|---|---|---|---|
| 90 | Cl | Cl | Cl | Cl | H | H | Cu | orange |
| 91 | Cl | Cl | Cl | Cl | H | H | Zn | orange |
| 92 | $CH_3O$ | Cl | $CH_3O$ | Cl | H | H | Ni | orange |
| 93 | $CH_3O$ | Cl | $CH_3O$ | Cl | H | H | Cu | brown |
| 94 | Cl | Cl | Cl | Cl | COOH | H | Ni | orange |
| 95 | Cl | Cl | Cl | Cl | COOH | H | Zn | orange |
| 96 | Cl | Cl | Cl | Cl | COOH | H | Cd | yellow |
| 97 | $CH_3O$ | Cl | $CH_3O$ | Cl | COOH | H | Ni | orange |
| 98 | $CH_3O$ | Cl | $CH_3O$ | Cl | COOH | H | Cu | yellow |
| 99 | Cl | Cl | Cl | Cl | COOH | Br | Ni | orange |
| 100 | Cl | Cl | Cl | Cl | COOH | Br | Cu | yellow |
| 101 | $CH_3O$ | Cl | $CH_3O$ | Cl | COOH | Br | Ni | yellow-orange |
| 102 | $CH_3O$ | Cl | $CH_3O$ | Cl | COOH | Br | Cu | yellow |

Table VIII-continued

| Example No. | X₁ | X₂ | X₃ | X₄ | Y₁ | Y₂ | M | Shade |
|---|---|---|---|---|---|---|---|---|
| 103 | Cl | Cl | Cl | Cl | CONH—⟨phenyl⟩ | H | Cu | brown |
| 104 | Cl | Cl | Cl | Cl | CONH—⟨phenyl⟩ | H | Zn | orange |
| 105 | Cl | Cl | Cl | Cl | Cl, CONH—⟨phenyl⟩—CH₃ | H | Cu | brown |
| 106 | Cl | Cl | Cl | Cl | Cl, CONH—⟨phenyl⟩—CH₃ | H | Zn | orange |
| 107 | CH₃O | Cl | CH₃O | Cl | CONH—⟨phenyl⟩—Cl | H | Ni | brown |
| 108 | CH₃O | Cl | CH₃O | Cl | CONH—⟨phenyl⟩—Cl | H | Cu | brown |
| 109 | H | H | H | H | H | H | Ni | yellow |
| 110 | H | H | H | H | H | H | Cu | yellow |
| 111 | H | H | H | H | H | H | Co | yellow-brown |

EXAMPLE 112

1.48 g of the bishydrazone of Example 20 are reacted in 60 ml of methylcellosolve with 0.66 g of Cu(ac)₂.H₂O for 3 hours at 90° C. The green-yellow reaction product is filtered off while warm, washed well with methylcellosolve, alcohol and acetone and dried at 100° C. 1.55 g (93%) are obtained of a greenish-tinged yellow pigment of the formula

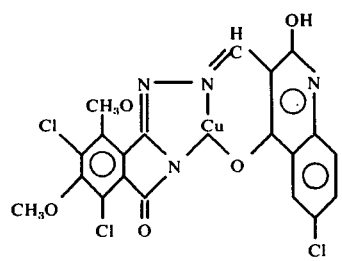

which colours PVC in greenish-tinged yellow shades of outstanding fastness to light and migration.

The metal complexes of the formula

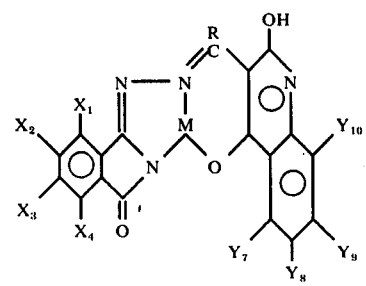

wherein the symbols have the meaning indicated in Table IX which follows are obtained by an analogous process.

Table IX

| Example No. | X₁ | X₂ | X₃ | X₄ | Y₇ | Y₈ | Y₉ | Y₁₀ | R | M | Shade |
|---|---|---|---|---|---|---|---|---|---|---|---|
| 113 | Cl | Cl | Cl | Cl | H | H | H | H | H | Ni | yellow |
| 114 | Cl | Cl | Cl | Cl | H | H | H | H | H | Cu | yellow-green |
| 115 | Cl | Cl | Cl | Cl | H | H | H | H | H | Zn | yellow |
| 116 | Cl | Cl | Cl | Cl | H | Cl | H | H | H | Ni | yellow |
| 117 | Cl | Cl | Cl | Cl | H | Cl | H | H | H | Cu | yellow-green |
| 118 | Cl | Cl | Cl | Cl | H | Cl | H | H | H | Zn | yellow |
| 119 | Cl | Cl | Cl | Cl | H | CH₃ | H | H | H | Ni | yellow-orange |
| 120 | Cl | Cl | Cl | Cl | H | CH₃ | H | H | H | Cu | yellow |
| 121 | Cl | Cl | Cl | Cl | H | CH₃ | H | H | H | Zn | yellow |
| 122 | Cl | Cl | Cl | Cl | H | H | H | Cl | H | Ni | yellow |
| 123 | Cl | Cl | Cl | Cl | H | H | H | Cl | H | Cu | yellow-green |
| 124 | Cl | Cl | Cl | Cl | H | H | H | Cl | H | Zn | yellow |
| 125 | Cl | Cl | Cl | Cl | H | H | Cl | Cl | H | Ni | yellow |
| 126 | Cl | Cl | Cl | Cl | H | H | Cl | Cl | H | Cu | yellow-green |
| 127 | Cl | Cl | Cl | Cl | H | H | Cl | Cl | H | Zn | yellow |
| 128 | Cl | Cl | OCH₃ | Cl | H | H | H | H | H | Ni | yellow |
| 129 | Cl | Cl | OCH₃ | Cl | H | H | H | H | H | Cu | green-yellow |
| 130 | Cl | Cl | OCH₃ | Cl | H | Cl | H | H | H | Ni | yellow |
| 131 | Cl | Cl | OCH₃ | Cl | H | Cl | H | H | H | Cu | yellow-green |
| 132 | OCH₃ | Cl | OCH₃ | Cl | H | H | H | H | H | Ni | yellow |
| 133 | OCH₃ | Cl | OCH₃ | Cl | H | H | H | H | H | Cu | yellow |

Table IX-continued

| Example No. | X₁ | X₂ | X₃ | X₄ | Y₇ | Y₈ | Y₉ | Y₁₀ | R | M | Shade |
|---|---|---|---|---|---|---|---|---|---|---|---|
| 134 | OCH₃ | Cl | OCH₃ | Cl | H | CH₃ | H | H | H | Ni | yellow |
| 135 | OCH₃ | Cl | OCH₃ | Cl | H | CH₃ | H | H | H | Cu | greenish-tinged yellow |
| 136 | OCH₃ | Cl | OCH₃ | Cl | H | Cl | H | H | H | Ni | yellow |
| 137 | Cl | Cl | Cl | Cl | H | H | H | H | CH₃ | Ni | yellow |
| 138 | Cl | Cl | Cl | Cl | H | H | H | H | CH₃ | Cu | yellow |
| 139 | Cl | Cl | Cl | Cl | H | CH₃ | H | H | CH₃ | Ni | yellow |
| 140 | Cl | Cl | Cl | Cl | H | CH₃ | H | H | CH₃ | Cu | yellow |
| 141 | Cl | Cl | Cl | Cl | H | Cl | H | H | CH₃ | Ni | yellow-brown |
| 142 | Cl | Cl | Cl | Cl | H | Cl | H | H | CH₃ | Cu | yellow-brown |
| 143 | OCH₃ | Cl | OCH₃ | Cl | H | H | H | H | CH₃ | Ni | yellow |
| 144 | OCH₃ | Cl | OCH₃ | Cl | H | H | H | H | CH₃ | Cu | yellow |
| 145 | OCH₃ | Cl | OCH₃ | Cl | H | CH₃ | H | H | CH₃ | Ni | yellow |
| 146 | OCH₃ | Cl | OCH₃ | Cl | H | CH₃ | H | H | CH₃ | Cu | yellow |
| 147 | OCH₃ | Cl | OCH₃ | Cl | H | Cl | H | H | CH₃ | Ni | yellow |
| 148 | OCH₃ | Cl | OCH₃ | Cl | H | Cl | H | H | CH₃ | Cu | yellow |
| 149 | OCH₃ | Cl | OCH₃ | Cl | H | Cl | H | H | CH₃ | Co | yellow-brown |
| 150 | H | H | H | H | H | H | H | H | H | Ni | greenish-tinged yellow |
| 151 | H | H | H | H | H | H | H | H | H | Cu | greenish-tinged yellow |
| 152 | CH₃O | Cl | OCH₃ | Cl | H | H | Cl | Cl | H | Ni | yellow |
| 153 | CH₃O | Cl | OCH₃ | Cl | H | H | Cl | Cl | H | Cu | greenish-tinged yellow |
| 154 | H | H | H | H | H | H | H | H | CH₃ | N | yellow |
| 155 | H | H | H | H | H | H | H | H | CH₃ | Cu | yellow-green |
| 156 | H | H | H | H | H | Cl | H | H | CH₃ | N | yellow |
| 157 | H | H | H | H | H | Cl | H | H | CH₃ | Cu | yellow-green |
| 158 | Cl | Cl | Cl | Cl | H | H | Cl | Cl | CH₃ | Ni | orange |
| 159 | Cl | Cl | Cl | Cl | H | H | Cl | Cl | CH₃ | Cu | yellow |
| 160 | Cl | Cl | CH₃O | Cl | H | H | H | H | CH₃ | Ni | yellow |
| 161 | Cl | Cl | CH₃O | Cl | H | H | H | H | CH₃ | Cu | yellow |
| 162 | Cl | Cl | PhO | Cl | H | H | H | H | H | Ni | yellow |
| 163 | Cl | Cl | PhO | Cl | H | H | H | H | H | Cu | yellow-green |
| 164 | Cl | Cl | PhO | Cl | H | H | H | H | CH₃ | Ni | yellow |
| 165 | Cl | Cl | PhO | Cl | H | H | H | H | CH₃ | Cu | yellow |
| 166 | CH₃O | Cl | CH₃O | Cl | H | Cl | H | H | CH₃ | Ni | yellow |
| 167 | CH₃O | Cl | CH₃O | Cl | H | Cl | H | H | CH₃ | Cu | yellow-green |
| 168 | CH₃O | Cl | CH₃O | Cl | H | H | Cl | Cl | H | Ni | yellow |
| 169 | CH₃O | Cl | CH₃O | Cl | H | H | Cl | Cl | H | Cu | yellow-green |
| 170 | CH₃O | Cl | CH₃O | Cl | H | H | Cl | Cl | CH₃ | Ni | yellow |
| 171 | CH₃O | Cl | CH₃O | Cl | H | H | Cl | Cl | CH₃ | Cu | yellow |

EXAMPLE 172

2.40 g of the bishydrazone of Example 40 are reacted in 60 ml of methylcellosolve with 1.10 g of Cu(ac)₂.H₂O for 5 hours at 90° C. The reaction product is filtered off, washed with methylcellosolve and alcohol and dried at 80° C. 2.30 g (85% of theory) are obtained of a yellow-brown pigment of the formula

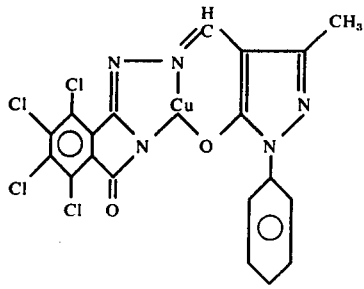

which colours PVC in yellow shades of good fastness to light and migration.

The metal complexes of the formula

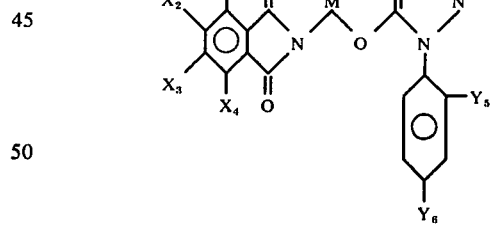

wherein the symbols have the meaning indicated in Table X which follows, are obtained by an analogous process.

Table X

| Example No. | X₁ | X₂ | X₃ | X₄ | Y₅ | Y₆ | R₆ | M | Shade |
|---|---|---|---|---|---|---|---|---|---|
| 173 | Cl | Cl | Cl | Cl | H | | CH₃ | Ni | yellow |
| 174 | Cl | Cl | Cl | Cl | H | | CH₃ | Zn | yellow |
| 175 | Cl | Cl | Cl | Cl | Cl | | CH₃ | Ni | yellow |
| 176 | Cl | Cl | Cl | Cl | Cl | | CH₃ | Cu | yellow-green |
| 177 | OCH₃ | Cl | OCH₃ | Cl | H | | COOC₂H₅ | Ni | yellow |
| 178 | OCH₃ | Cl | OCH₃ | Cl | H | | COOC₂H₅ | Cu | yellow-brown |
| 179 | Cl | Cl | Cl | Cl | H | CH₃ | CH₃ | Ni | yellow |
| 180 | Cl | Cl | Cl | Cl | H | CH₃ | CH₃ | Cu | yellow |
| 181 | CH₃O | Cl | CH₃O | Cl | H | CH₃ | CH₃ | Ni | yellow |
| 182 | CH₃O | Cl | CH₃O | Cl | H | CH₃ | CH₃ | Cu | yellow-green |
| 183 | CH₃O | Cl | CH₃O | Cl | H | H | CONH₂ | Ni | yellow |

Table X-continued

| Example No. | $X_1$ | $X_2$ | $X_3$ | $X_4$ | $Y_5$ | $Y_6$ | $R_6$ | M | Shade |
|---|---|---|---|---|---|---|---|---|---|
| 184 | $CH_3O$ | Cl | $CH_3O$ | Cl | H | H | $CONH_2$ | Cu | yellow-green |

EXAMPLES 185–188

The metal complexes of the following formula

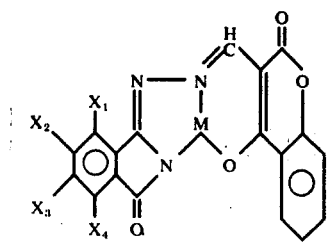

wherein the symbols have the meaning indicated in Table XI which follows, are obtained by the methods described above from the bishydrazones of Examples 46 and 47.

Table XI

| Example No. | $X_1$ | $X_2$ | $X_3$ | $X_4$ | M | Shade |
|---|---|---|---|---|---|---|
| 185 | Cl | Cl | Cl | Cl | Ni | yellow |
| 186 | Cl | Cl | Cl | Cl | Cu | yellow-green |
| 187 | $OCH_3$ | Cl | $OCH_3$ | Cl | Ni | yellow |
| 188 | $OCH_3$ | Cl | $OCH_3$ | Cl | Cu | yellow-green |

EXAMPLES 189–197

The metal complexes of the following formula are obtained by reacting the bishydrazones obtained in accordance with Example 1 with the corresponding metal salts

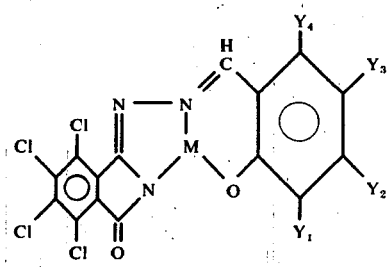

The following table indicates the meaning of the symbols:

Table XII

| Example No. | $Y_1$ | $Y_2$ | $Y_3$ | $Y_4$ | M | Shade |
|---|---|---|---|---|---|---|
| 189 | H | H | H | H | Ni | yellow |
| 190 | H | H | H | H | Zn | yellow |
| 191 | H | H | H | H | Cd | yellow |
| 192 | $OC_2H_5$ | H | H | H | Ni | orange |
| 193 | $OC_2H_5$ | H | H | H | Zn | yellow |
| 194 | $OC_2H_5$ | H | H | H | Cd | yellow |
| 195 | Cl | H | Cl | H | Ni | brown |
| 196 | Cl | H | Cl | H | Zn | yellow |
| 197 | Cl | H | Cl | H | Cd | yellow |

EXAMPLE 198

1.50 g of the bishydrazone of Example 48 are heated in 70 ml of methylcellosolve with 0.63 g of Cu(ac)$_2$.-H$_2$O for 3 hours at 100° C. The yellow-green suspension is filtered hot; the filter residue is washed well with methylcellosolve, alcohol and acetone and dried at 80° C. 1.2 g (70% of theory) are obtained of a greenish-tinged yellow pigment of the formula

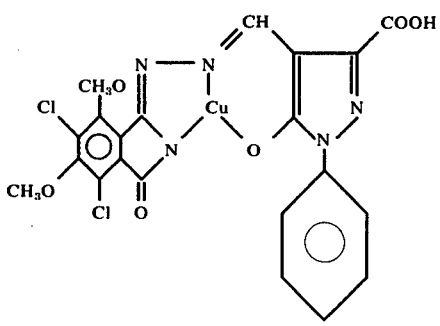

EXAMPLE 199

The procedure is as indicated in Example 198, but the bishydrazone of Example 49 is used as the starting material. The greenish-tinged yellow pigment of the formula

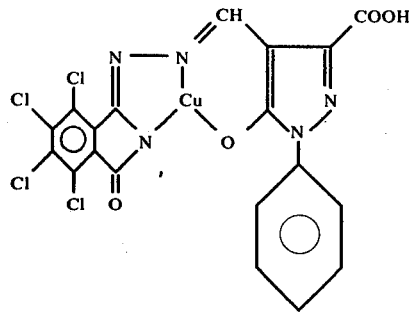

is obtained.

EXAMPLE 200

Ba salt of the colorant according to Example 198

1.50 g of the bishydrazone of Example 48 are reacted in 70 ml of methylcellosolve with 0.63 g of Cu(ac)$_2$.-H$_2$O for 3 hours at 100° C. A solution of 1 g of Ba-(OH)$_2$.8H$_2$O in 20 ml of water is run dropwise into this yellow-green suspension. The reaction mixture is heated for a further 2 hours at 100° C and is then filtered hot. The filter residue is washed well with methylcellosolve, water, alcohol and acetone and dried at 90° C. 1.8 g are obtained of a yellow-green pigment which colours PVC in greenish-tinged yellow shades of good fastness to light and migration.

EXAMPLE 201

The barium salt of the copper complex of Example 199 is prepared by the process of Example 200. A pigment is obtained which colours PVC in greenish-tinged yellow shades of good fastness to light and migration.

EXAMPLE 202

The nickel complex of the same colorant is prepared by the process of Example 200. It colours PVC in yellow shades of good fastness to light and migration.

EXAMPLES 203-206

The metal complexes of the following formula are obtained by reacting the bishydrazones obtained in accordance with Examples 56 and 57, with the corresponding metal salts.

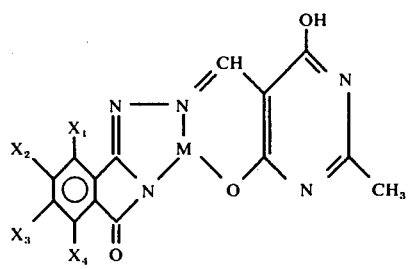

The following table indicates the meaning of the symbols.

Table XIII

| Example No. | $X_1$ | $X_2$ | $X_3$ | $X_4$ | M | Shade |
|---|---|---|---|---|---|---|
| 203 | Cl | Cl | Cl | Cl | Ni | yellow |
| 204 | Cl | Cl | Cl | Cl | Cu | yellow-green |
| 205 | $CH_3O$ | Cl | $CH_3O$ | Cl | Ni | yellow |
| 206 | $CH_3O$ | Cl | $CH_3O$ | Cl | Cu | yellow-green |

EXAMPLES 207-218

The metal complexes of the following formula are obtained by reacting the bishydrazones of Examples 58-63 with the corresponding metal salts.

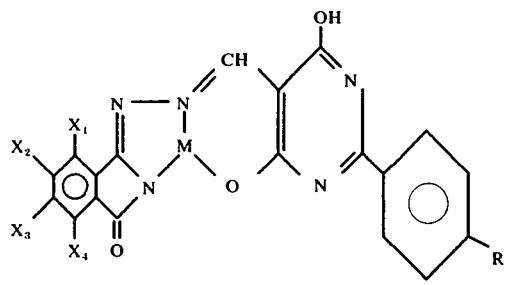

Table XIV

| Example No. | $X_1$ | $X_2$ | $X_3$ | $X_4$ | R | M | Shade |
|---|---|---|---|---|---|---|---|
| 207 | Cl | Cl | Cl | Cl | H | Ni | yellow |
| 208 | Cl | Cl | Cl | Cl | H | Cu | yellow-green |
| 209 | Cl | Cl | $CH_3O$ | Ci | H | Ni | yellow |
| 210 | Cl | Cl | $CH_3O$ | Cl | H | Cu | yellow-green |
| 211 | $CH_3O$ | Cl | $CH_3O$ | Cl | H | Ni | yellow |
| 212 | $CH_3O$ | Cl | $CH_3O$ | cl | H | Cu | yellow-green |
| 213 | Cl | Cl | Cl | Cl | $CH_3$ | Ni | yellow |
| 214 | Cl | Cl | Cl | Cl | $CH_3$ | Cu | yellow-green |
| 215 | Cl | Cl | $CH_3O$ | Cl | $CH_3$ | Ni | yellow |
| 216 | Cl | Cl | $CH_3O$ | Cl | $CH_3$ | Cu | yellow-green |
| 217 | $CH_3O$ | Cl | $CH_3O$ | Cl | $CH_3$ | Ni | yellow |
| 218 | $CH_3O$ | Cl | $CH_3O$ | Cl | $CH_3$ | Cu | yellow-green |

EXAMPLES 219-230

The metal complexes of the following formula are obtained by reacting the bishydrazones obtained in accordance with Examples 50-55 with the corresponding metal salts.

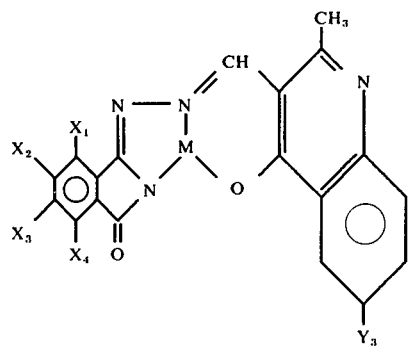

The following table indicates the meaning of the symbols.

Table XV

| Example No. | $X_1$ | $X_2$ | $X_3$ | $X_4$ | $Y_3$ | M | Shade |
|---|---|---|---|---|---|---|---|
| 219 | Cl | Cl | Cl | Cl | H | Ni | yellow |
| 220 | Cl | Cl | Cl | Cl | H | Cu | yellow-green |
| 221 | $CH_3O$ | Cl | $CH_3O$ | Cl | H | Ni | yellow |
| 222 | $CH_3O$ | Cl | $CH_3O$ | Cl | H | Cu | yellow-green |
| 223 | Cl | Cl | Cl | Cl | $CH_3O$ | Ni | yellow |
| 224 | Cl | Cl | Cl | Cl | $CH_3O$ | Cu | yellow-green |
| 225 | $CH_3O$ | Cl | $CH_3O$ | Cl | $CH_3O$ | Ni | yellow |
| 226 | $CH_3O$ | Cl | $CH_3O$ | Cl | $CH_3O$ | Cu | yellow-green |
| 227 | Cl | Cl | Cl | Cl | Cl | Ni | yellow |
| 228 | Cl | Cl | Cl | Cl | Cl | Cu | yellow-green |
| 229 | $CH_3O$ | Cl | $CH_3O$ | Cl | Cl | Ni | yellow |
| 230 | $CH_3O$ | Cl | $CH_3O$ | Cl | Cl | Cu | yellow-green |

EXAMPLES 231-238

The metal complexes of the following formula are obtained by reacting the bishydrazones of Examples 64-67 with the corresponding metal salts.

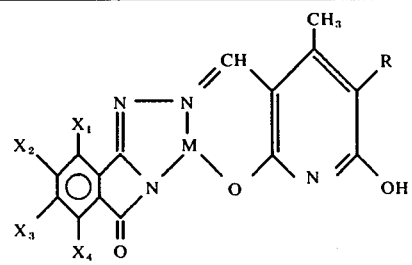

| Example No. | $X_1$ | $X_2$ | $X_3$ | $X_4$ | R | M | Shade |
|---|---|---|---|---|---|---|---|
| 231 | Cl | Cl | Cl | Cl | CN | Ni | yellow |
| 232 | Cl | Cl | Cl | Cl | CN | Cu | yellow |
| 233 | $CH_3O$ | Cl | $CH_3O$ | Cl | CN | Ni | yellow |
| 234 | $CH_3O$ | Cl | $CH_3O$ | Cl | CN | Cu | green-yellow |
| 235 | Cl | Cl | Cl | Cl | $CONH_2$ | Ni | yellow |
| 236 | Cl | Cl | Cl | Cl | $CONH_2$ | Cu | yellow |
| 237 | $CH_3O$ | Cl | $CH_3O$ | Cl | $CONH_2$ | Ni | yellow |
| 238 | $CH_3O$ | Cl | $CH_3O$ | Cl | $CONH_2$ | Cu | yellow-green |

EXAMPLES 239–245

The metal complexes of the following formula are obtained by reacting the bishydrazones of Examples 68–70 with the corresponding metal salts.

| Example No. | $X_1$ | $X_2$ | $X_3$ | $X_4$ | R | M | Shade |
|---|---|---|---|---|---|---|---|
| 239 | Cl | Cl | Cl | Cl | CN | Ni | orange |
| 240 | Cl | Cl | Cl | Cl | CN | Cu | yellow |
| 241 | $CH_3O$ | Cl | $CH_3O$ | Cl | CN | Ni | yellow |
| 242 | $CH_3O$ | Cl | $CH_3O$ | Cl | CN | Cu | yellow-green |
| 243 | $CH_3O$ | Cl | $CH_3O$ | Cl | CN | Co | yellow |
| 244 | $CH_3O$ | Cl | $CH_3O$ | Cl | $CONH_2$ | Ni | yellow |
| 245 | $CH_3O$ | Cl | $CH_3O$ | Cl | $CONH_2$ | Cu | brown |

EXAMPLES 246–277

The metal complexes of the following formula are obtained by reacting the bishydrazones of the Examples under 1 with the corresponding metal salts.

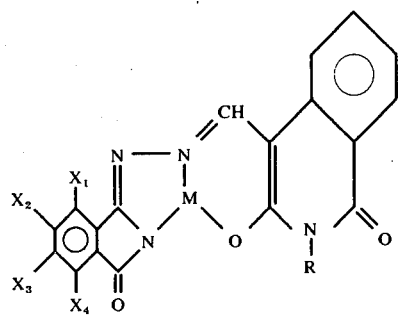

| Ex. No. | $X_1$ | $X_2$ | $X_3$ | $X_R$ | M | Shade |
|---|---|---|---|---|---|---|
| 246 | Cl | Cl | Cl | Cl | H | Ni red-brown |
| 247 | Cl | Cl | Cl | Cl | H | Cu brown |
| 248 | Cl | Cl | $CH_3O$ | Cl | H | Ni red-brown |
| 249 | Cl | Cl | $CH_3O$ | Cl | H | Cu yellow-brown |
| 250 | $CH_3O$ | Cl | $CH_3O$ | Cl | H | Ni yellow-brown |
| 251 | $CH_3O$ | Cl | $CH_3O$ | Cl | H | Cu yellow |
| 252 | Cl | Cl | Cl | Cl | $CH_3$ | Ni red-brown |
| 253 | Cl | Cl | Cl | Cl | $CH_3$ | Cu brown |
| 254 | Cl | Cl | $CH_3O$ | Cl | $CH_3$ | Ni red-brown |
| 255 | Cl | Cl | $CH_3O$ | Cl | $CH_3$ | Cu brown |
| 256 | $CH_3O$ | Cl | $CH_3O$ | Cl | $CH_3$ | Ni red-brown |
| 257 | $CH_3O$ | Cl | $CH_3O$ | Cl | $CH_3$ | Cu yellow-brown |
| 258 | Cl | Cl | Cl | Cl | –C₆H₅ | Ni red |
| 259 | Cl | Cl | Cl | Cl | –C₆H₅ | Cu orange |
| 260 | Cl | Cl | $CH_3O$ | Cl | –C₆H₅ | Ni red |
| 261 | Cl | Cl | $CH_3O$ | Cl | –C₆H₅ | Cu orange |
| 262 | $CH_3O$ | Cl | $CH_3O$ | Cl | –C₆H₅ | Ni red-brown |
| 263 | $CH_3O$ | Cl | $CH_3O$ | Cl | –C₆H₅ | Cu yellow-brown |
| 264 | Cl | Cl | Cl | Cl | –C₆H₄–Cl | Ni red |
| 265 | Cl | Cl | Cl | Cl | –C₆H₄–Cl | Cu yellow-orange |
| 266 | Cl | Cl | $CH_3O$ | Cl | –C₆H₄–Cl | Ni red-brown |
| 267 | Cl | Cl | $CH_3O$ | Cl | –C₆H₄–Cl | Cu yellow-brown |
| 268 | $CH_3O$ | Cl | $CH_3O$ | Cl | –C₆H₄–Cl | Ni red-brown |
| 269 | $CH_3O$ | Cl | $CH_3O$ | Cl | –C₆H₄–Cl | Cu yellow-brown |
| 270 | Cl | Cl | Cl | Cl | –C₆H₄–$OCH_3$ | Ni red |
| 271 | Cl | Cl | Cl | Cl | –C₆H₄–$OCH_3$ | Cu red-brown |
| 272 | Cl | Cl | $CH_3O$ | Cl | –C₆H₄–$OCH_3$ | Ni red-brown |
| 273 | Cl | Cl | $CH_3O$ | Cl | –C₆H₄–$OCH_3$ | Cu yellow-brown |
| 274 | $CH_3O$ | Cl | $CH_3O$ | Cl | –C₆H₄–$OCH_3$ | Ni red-brown |
| 275 | $CH_3O$ | Cl | $CH_3O$ | Cl | –C₆H₄–$OCH_3$ | Cu yellow-brown |
| 276 | Cl | Cl | Cl | Cl | naphthyl | Ni red |
| 277 | Cl | Cl | Cl | Cl | naphthyl | Cu red-brown |

EXAMPLE 278

All the metal complexes described can also be prepared directly from the components, isoindolinone-3-ylidene hydrazine, hydroxy-aldehyde or hydroxy-ketone and metal salt by the one-pot method.

1.45 g of 5,7-dichloro-4,6-dimethoxy-isoindolin-1-on-3-ylidene hydrazine, 0.945 g of 2,4-dihydroxyquinoline-3-aldehyde and 1.25 g of Ni(ac)$_2$·4H$_2$O are reacted for 1 hour at 100° C in 50 ml of glacial acetic acid. The yellow-orange suspension is filtered at 80° C, washed well with glacial acetic acid, alcohol and acetone and dried at 80° C. 2.40 g (93% of theory) of a yellow pigment, identical with the product of Example 132, are obtained.

The formation of the metal complex can also be carried out in, for example, dimethylformamide, methylcellosolve, ethylcellosolve, Carbitol and glycol, instead of glacial acetic acid.

EXAMPLE 279

65 parts of stabilised polyvinyl chloride, 35 parts of dioctyl phthalate and 0.2 part of the colorant obtained in accordance with Example 89 are stirred together with one another and are then worked for 7 minutes at 140° C on a twin-roll calender. An orange sheet of very good fastness to light and migration is obtained.

EXAMPLE 280

1.00 g of the pigment prepared according to Example 113 is finely ground on an Engelsmann grinding machine together with 4.00 g of printer's varnish of the following composition:

| | |
|---|---|
| 29.4% of linseed oil-stand oil | (300 poises), |
| 67.2% of linseed oil-stand oil | (20 poises), |
| 2.1% of cobalt octoate | (8% of Co) and |
| 1.3% of lead octoate | (24% of Pb) | and is then printed on art printing paper at 1 g/m$^2$ in the letterpress process with the aid of a block. A strong, pure shade of yellow, having good transparency and good gloss, is obtained. Very brilliant green shades can be produced in three- or four-colour printing by overprinting on blue.

The pigment is also suitable for other printing processes, such as gravure printing, offset printing and flexographic printing, and here too gives very good results.

What we claim is:

1. Azomethine pigments of the formula

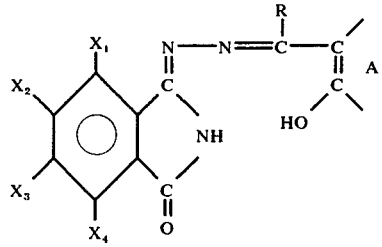

and metal complexes thereof, wherein A denotes an isocyclic or heterocyclic aromatic radical, R denotes a H atom, $X_2$ and $X_4$ denote H atoms or halogen atoms, $X_1$ and $X_3$ denote H atoms or halogen atoms, alkoxy or alkylmercapto groups containing 1–6 C atoms, cycloalkoxy groups containing 5–6 C atoms, or aralkoxy, aryloxy or arylmercapto groups, it being possible for one of the substituents $X_1$–$X_4$ also to be a nitro group.

2. Azomethine pigments according to claim 1, of the formula

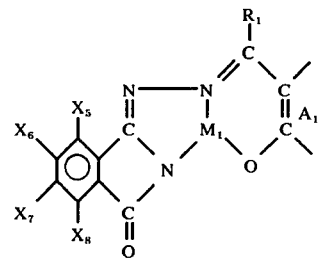

wherein M denotes a divalent metal atom and A, R and $X_1$–$X_4$ have the meaning indicated in claim 1.

3. Azomethine pigments according to claim 2, of the formula

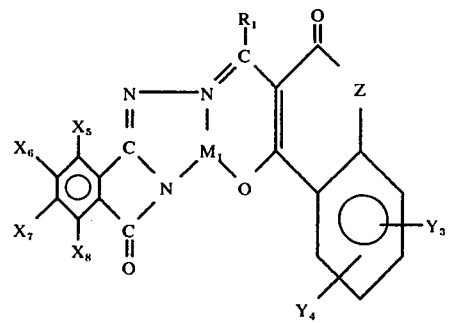

wherein $A_1$ denotes a benzene, pyridine, pyrimidine, or pyrane radical which can also contain a fused benzene nucleus, or denotes a pyrazolone radical, $R_1$ denotes a hydrogen atom, $M_1$ denotes a copper or nickel atom, $X_5$ and $X_7$ denote H atoms or chlorine atoms or alkoxy groups containing 1–4 C atoms, and $X_6$ and $X_8$ denote H atoms or chlorine atoms, $X_6$ and $X_8$ representing chlorine atoms if $X_5$ and $X_7$ denote alkoxy groups.

4. Azomethine pigments according to claim 3, of the formula

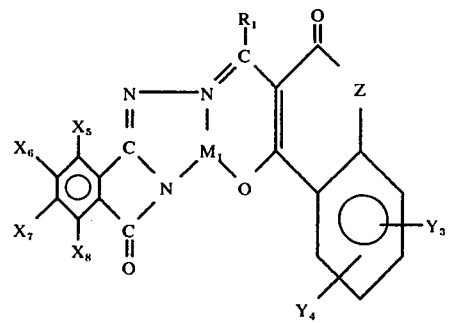

wherein $R_1$, $M_1$ and $X_5$ to $X_8$ have the meaning indicated in claim 3, $Y_3$ and $Y_4$ denote H atoms or halogen atoms, alkyl or alkoxy groups containing 1–4 C atoms, nitro groups or groups of the formula

wherein $M_2$ denotes a Ca, Sr, Ba or Mn atom, and Z represents an O atom or an imino group.

5. Azomethine pigments according to claim 4, of the formula

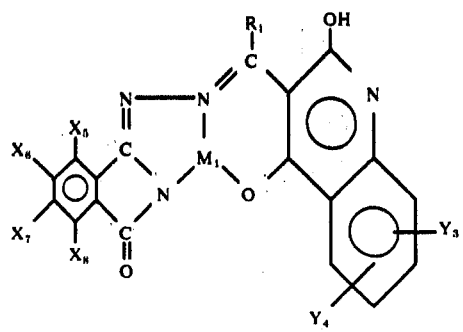

wherein $R_1$, $M_1$, $X_5$ to $X_8$, $Y_3$ and $Y_4$ have the meaning indicated in claims 3 and 4.

6. Azomethine pigments according to claim 3, of the formula

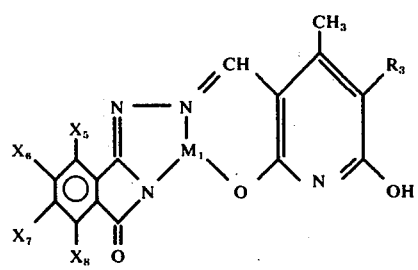

wherein $M_1$ and $X_5$ to $X_8$ have the meaning indicated in claim 3, and $R_3$ denotes nitrile or a carbamoyl group.

7. Azomethine pigments according to claim 3, of the formula

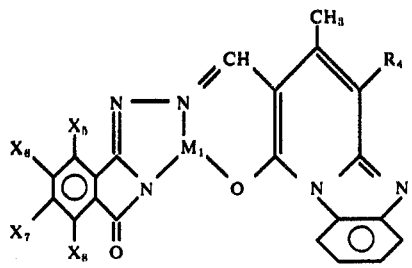

wherein $M_1$ and $X_5$ to $X_8$ have the meaning indicated in claim 3, and $R_4$ denotes nitrile or a carbamoyl group.

8. Azomethine pigments according to claim 3, of the formula

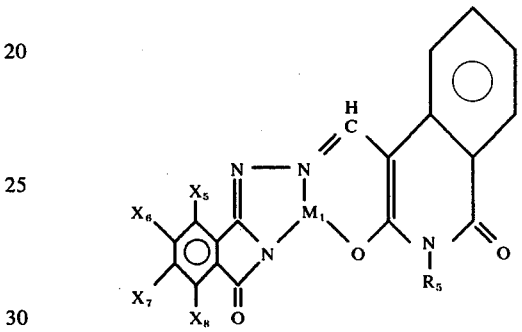

wherein $M_1$ and $X_5$ to $X_8$ have the meaning indicated in claim 3, and $R_5$ denotes a hydrogen atom or a lower alkyl group or an aryl group.

* * * * *

UNITED STATES PATENT AND TRADEMARK OFFICE
CERTIFICATE OF CORRECTION

PATENT NO. : 4,024,132
DATED : MAY 17, 1977
INVENTOR(S) : FRANCOIS L'EPLATTENIER ET AL

It is certified that error appears in the above-identified patent and that said Letters Patent are hereby corrected as shown below:

Page 1, between lines 14 and 15, insert

--- Foreign Application Priority Data

September 7, 1973   Switzerland   12889/73 --- .

Signed and Sealed this

Fifteenth Day of November 1977

[SEAL]

Attest:

RUTH C. MASON
Attesting Officer

LUTRELLE F. PARKER
Acting Commissioner of Patents and Trademarks